(12) United States Patent
Stalder et al.

(10) Patent No.: US 9,923,437 B2
(45) Date of Patent: Mar. 20, 2018

(54) TOOL FOR MAKING GENERATOR BARS

(71) Applicant: ALSTOM Technology Ltd, Baden (CH)

(72) Inventors: Daniel Fritz Stalder, Uitikon Waldegg (CH); Reinhard Fischer, Horgen (CH); Thomas Morris, Zurich (CH); Simon Christoph Honold, Basel (CH); Patrik Kiss, Nussbaumen (CH)

(73) Assignee: General Electric Technology GmbH, Baden (CH)

( * ) Notice: Subject to any disclaimer, the term of this patent is extended or adjusted under 35 U.S.C. 154(b) by 227 days.

(21) Appl. No.: 15/045,737

(22) Filed: Feb. 17, 2016

(65) Prior Publication Data

US 2016/0164385 A1    Jun. 9, 2016

Related U.S. Application Data

(63) Continuation of application No. PCT/EP2014/065887, filed on Jul. 24, 2014.

(30) Foreign Application Priority Data

Aug. 19, 2013  (EP) .................................. 13180905

(51) Int. Cl.
| B23P 19/00 | (2006.01) |
| H02K 15/00 | (2006.01) |
| H02K 15/04 | (2006.01) |
| H02K 3/14 | (2006.01) |

(52) U.S. Cl.
CPC .......... *H02K 15/0414* (2013.01); *H02K 3/14* (2013.01); *H02K 15/045* (2013.01)

(58) Field of Classification Search
CPC ..... H02K 3/14; H02K 15/045; H02K 15/0414
See application file for complete search history.

(56) References Cited

U.S. PATENT DOCUMENTS

| 1,495,959 | A |   | 5/1924  | Mavity |
| 2,962,076 | A |   | 11/1960 | Durham |
| 4,138,874 | A | * | 2/1979  | Kolesar ................. H02K 15/04 29/736 |
| 6,631,335 | B2 | * | 10/2003 | Lusted .................... G01M 7/00 702/56 |
| 7,275,300 | B2 |   | 10/2007 | Clough et al. |
| 7,530,161 | B2 |   | 5/2009  | Clough et al. |

FOREIGN PATENT DOCUMENTS

DE              33 896 A      11/1964

OTHER PUBLICATIONS

"Turbo bars forming machine TBFM", (XP002721195), retrieved from the Internet: URL: http://www.vincent-industrie.com/en/activities/electrical/88-turbo-bars-forming-machine-tbfm.html  Mar. 5, 2014.

* cited by examiner

*Primary Examiner* — Paul D Kim
(74) *Attorney, Agent, or Firm* — GE Global Patent Operation; Rita D. Vacca

(57) ABSTRACT

A tool for shaping generator bars for large power generators. In particular, a tool for shaping a stator bar out of a straight unprocessed bar.

15 Claims, 5 Drawing Sheets

TOOL FOR MAKING GENERATOR BARS

CROSS-REFERENCE TO RELATED APPLICATIONS

This application claims priority to PCT/EP2014/065887 filed Jul. 24, 2014, which claims priority to EP Application No. 13180905.5 filed Aug. 19, 2013, both of which are hereby incorporated in their entirety.

TECHNICAL FIELD

The present disclosure relates to a tool for making stator bars for large power generators. More particularly, the present disclosure relates to a tool for shaping a stator bar out of a straight unprocessed bar.

BACKGROUND

State-of-the-art electric energy conversion relies on a three-phase power network with alternating currents (AC) at 50 Hz or 60 Hz frequency and a voltage levels ranging from several hundreds of Volts to hundreds of thousands of Volts. The conversion of rotating mechanical energy into electric energy and vice versa is done by generators and by motors respectively. Those rotating machines can be divided into asynchronous and synchronous apparatuses. The three-phase windings of such machines comprise Copper strands which after Roebelling form a conductor. The windings also require groundwall insulation, especially in the slot section. An assembly consisting of a Roebel conductor in the center and of surrounding groundwall insulation is commonly referred to as a stator bar.

When making stator bars, the conductor needs to be shaped. This disclosure uses the terms shaping stator bars and shaping the conductors inside a stator bar interchangeably. Unless otherwise indicated, the expression shaping a stator bar means shaping the conductors inside a stator bar.

The process of shaping is carried out in several steps involving a plurality of workbenches and gates. Typically, the first stage and the second stage bending are carried out at gate. Subsequently, the main involute is shaped Also, the ends of the stator bar are shaped, then the bar is consolidated and finally lugs at the end of the stator bar are brazed onto the bar. The purpose of the lugs is electric contact between the stator bars of a power generator. Another purpose of the lugs is electric contact to the terminals of the generator.

A number of approaches are mentioned in literature that try and overcome the above issues. U.S. Pat. No. 7,530,161 discloses a modular quick-form tooling system and stator bar set-up method. According to this application, a plurality of bend-forming tools 32, 33 are mounted on a support structure 31. A stator bar 20 is then inserted in between a guide portion 35 and the bend-forming tools 32, 33 to shape the stator bar 20.

U.S. Pat. No. 7,275,300 discloses a process for rewinding stator bars of a power generator. The process disclosed in U.S. Pat. No. 7,275,300 involves a quick form shown on FIG. 4 of the specification. The form is used to define the shapes of replacement stator bars during manufacturing. It fixates the core section 40 of a stator bar to end arm fixtures 42 on either end of the core section 40. The form also provides a lever to assist the bending process.

Yet another approach is disclosed on the internet http://www.vincent-industrie.com/en/activities/electrical/88-turbo-bars-forming-machine-tbfm.html. The machine disclosed therein uses a forming head and an involute support clamp to form stator bars for hydro- and for turbogenerators. The machine uses brushless motors to allow for accurate positioning of the stator bars during the forming process. Also, the stator bar forming machine is able to automatically load and unload bars in order to save time.

The established processes for making stator bars have several disadvantages. The sourcing time for the tool used for shaping the main involute is several weeks. Also, the process for setting up and adjusting that tool is known to be time-consuming. The process of shaping a generator bar is known to take as long as 4.5 (four and a half) hours.

The present disclosure is oriented towards providing the aforementioned needs and towards overcoming the aforementioned difficulties.

SUMMARY

The object of the present disclosure is a tool and a method that reduces the time required for shaping stator bars. This object is achieved by a tool and by a method according to the independent claims of this disclosure.

It is another object of the present disclosure to provide and tool and a method that are versatile. This means that a variety of different shapes of stator bars can be obtained by using the same tool or method.

It is another object of the present disclosure to provide a tool and a method suitable for generator rewinds. During a generator rewind, the stator bars of a generator need to be replaced by replacement bars. The tool and the method disclosed herein shall in particular reduce the time required for generator rewinds. The tool and the method disclosed herein shall also be versatile to allow rewinds of generators with a variety of different shapes of stator bars.

It is another object of the present disclosure to bring down the time required for preparation and adjustment of known tools. In a preferred embodiment, the time for preparation and adjustment shall be brought down from three weeks to three days.

It is another object of the present invention to come up with a modular tool for shaping stator bars. Modularity ensures the tool can easily be adapted to accommodate different sizes and shapes of stator bars.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
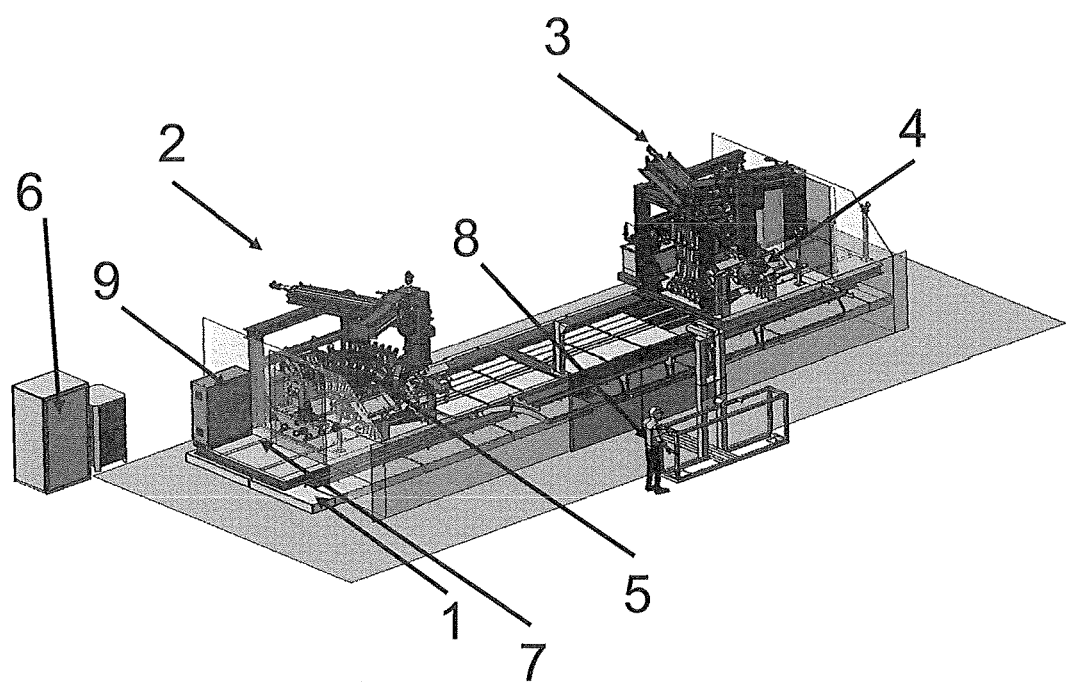
FIG. 1 provides a three-dimensional drawing of the complete tool for shaping stator bars of power generators.

FIG. 1 is a three-dimensional representation of the complete tool for shaping stator bars of power generators. The complete tool comprises a foundation 1. Two gates 2, 3 are mounted on the foundation 1. Each of the gates 2, 3 corresponds to a workbench where a number of stages of the shaping process are carried out. The first and the second stage of the shaping process are carried out by a set of tools 4 comprised in both gates.

Gate 2 comprises a plurality of index towers 5. The index towers 5 are used to shape the stator bars and are adjustable as will be described further on. The machine has got a total of 14 index towers. Another preferred embodiment comprises less than 20 index towers 5. A more preferred embodiment comprises less than 12 index towers 5. Yet another preferred embodiment comprises less than 8 index towers.

The complete tool may comprise one or several fixed electrical installations 6. These fixed electrical installations 6 would typically be arranged in cubicles and be mounted to the factory floor. Electronic equipment such as relays, programmable logic controllers, computers and fuses to control the process of shaping generator bars are typically arranged inside the cubicles 6.

The complete tool may also comprise a platform 7 to provide space for an operator 8. The operator would typically control and interfere with the bending process through a control cabinet 9. The gate control cabinet 9 will typically be connected to the cubicles 6, where the operator's commands are processed by various electronic processing means.

The index towers 5 may actuate in response to commands that are delivered directly by the control cabinet 9. The index towers 5 may also actuate based on commands that are entered in the control cabinet 9 and delivered through the cubicles 6. It seems worth noting the complete tool can be run either fully automated or partially manually operated through an operator 8.

Figure 2:
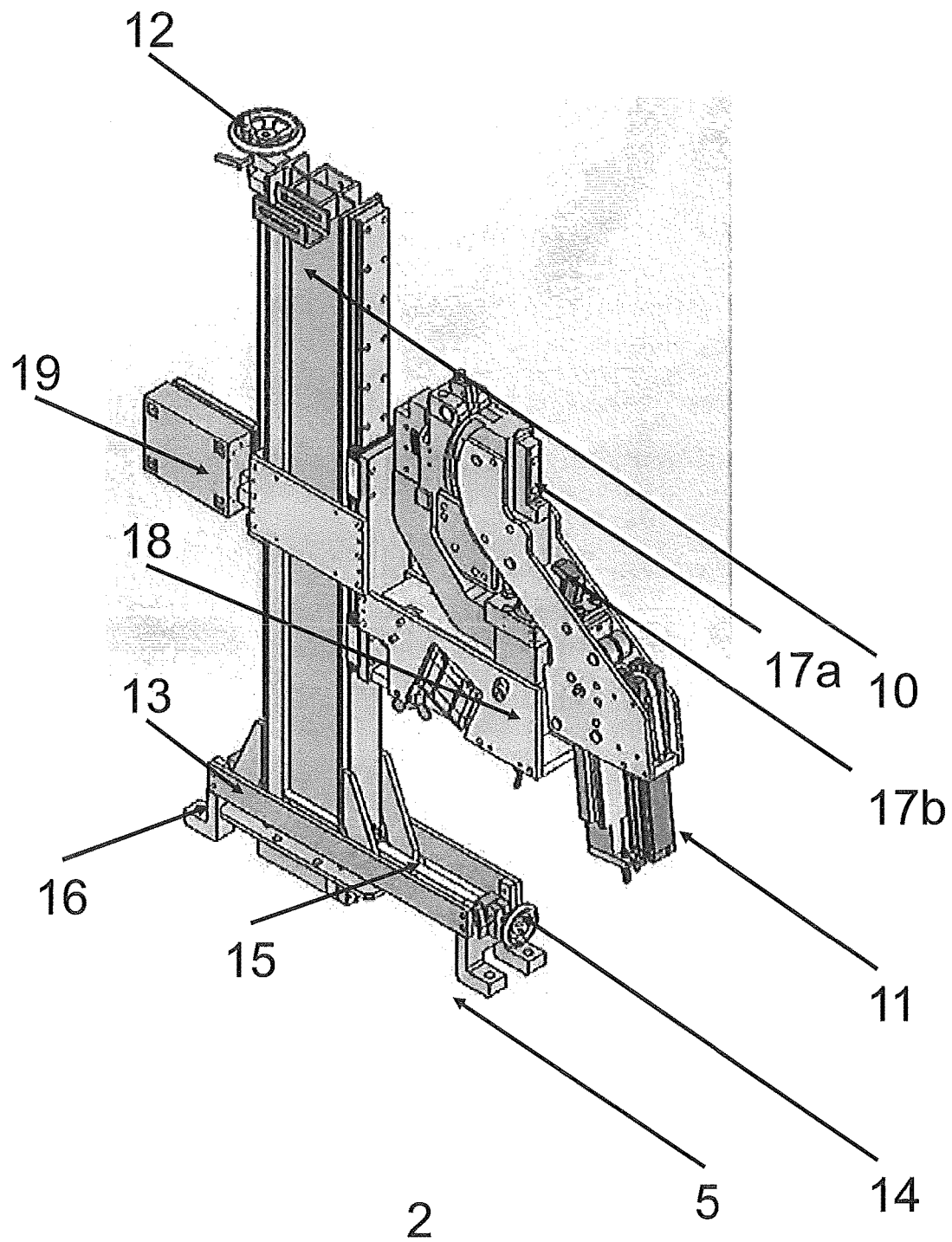
FIG. 2 shows an index tower 5 in three dimensions.

FIG. 2 shows an index tower 5 in three dimensions. The index tower 5 comprises a rail 10. A clamp assembly 11 can be shifted along that rail 10 by turning a wheel 12. The wheel 12 can either be operated manually or through a (brushless) motor (not shown on this drawing). The wheel 12 is preferably connected to a lead screw and shifts the clamp assembly 11 along the rail 10 through a nut.

Another set of two rails 13 allows the clamp assembly 11 to be shifted in a direction substantially perpendicular to the direction of the first rail 10. A wheel 14 is mounted on one end of the set of rails 13 and is connected to another lead screw 15. By turning the wheel 14 and the lead screw 15 the rail 10 with the clamp assembly 11 can be shifted along the set of rails 13. Like the wheel 12, the wheel 14 can be operated either manually or automatically through a (brushless) motor. All adjustable axes have locking mechanisms included.

In another embodiment, the lead screws are replaced by belts or chains that are either driven manually or operated automatically.

Preferably, the index tower 5 comprises a support structure with holes 16 that allow fixation of the index tower 5 to foundation 1 of the complete tool. In a preferred arrangement, there are four such holes 16. Fixation would typically be carried out through bolted connections, welded connections or rivets are also envisaged.

The clamp assembly 11 comprises two brackets 17a, 17b. The brackets 17a, 17b fix a stator bar during the shaping process. The brackets 17a, 17b are configured to withstand the forces that occur when shaping a stator bar made of metal, in particular a stator bar made of Copper or of an Aluminum alloy. To that end, the brackets 17a, 17b preferably engage or disengage pneumatically or hydraulically.

The brackets 17a, 17b are pivotally mounted to a support element 18. Due to the pivotal mounting, the brackets 17a, 17b may rotate about an axis parallel to the rail 10. The support element 18 would preferably provide a step motor to automate the rotation of the brackets 17a, 17b. In another embodiment, the support element 18 provides for manual adjustment of the angle at which the brackets 17a, 17b are pivotally mounted.

In another envisaged embodiment not shown on FIG. 2, the support 18 may rotate about an axis parallel to the set of rails 13. This embodiment gives the index tower 5 another degree of freedom by allowing for the clamp assembly 11 to rotate about one more axis. This rotation of the support 18 together with the clamp assembly 11 can also be carried out either manually or automatically through a (brushless) step motor.

In a preferred embodiment, the index tower 5 comprises a housing 19. The housing 19 is shifted together with the clamp assembly 11 along the rail 10. The housing 19 is typically used for any electronic components such as pre-amplifiers and position indicators that are required to run and control the clamp assembly 11.

Figure 3:
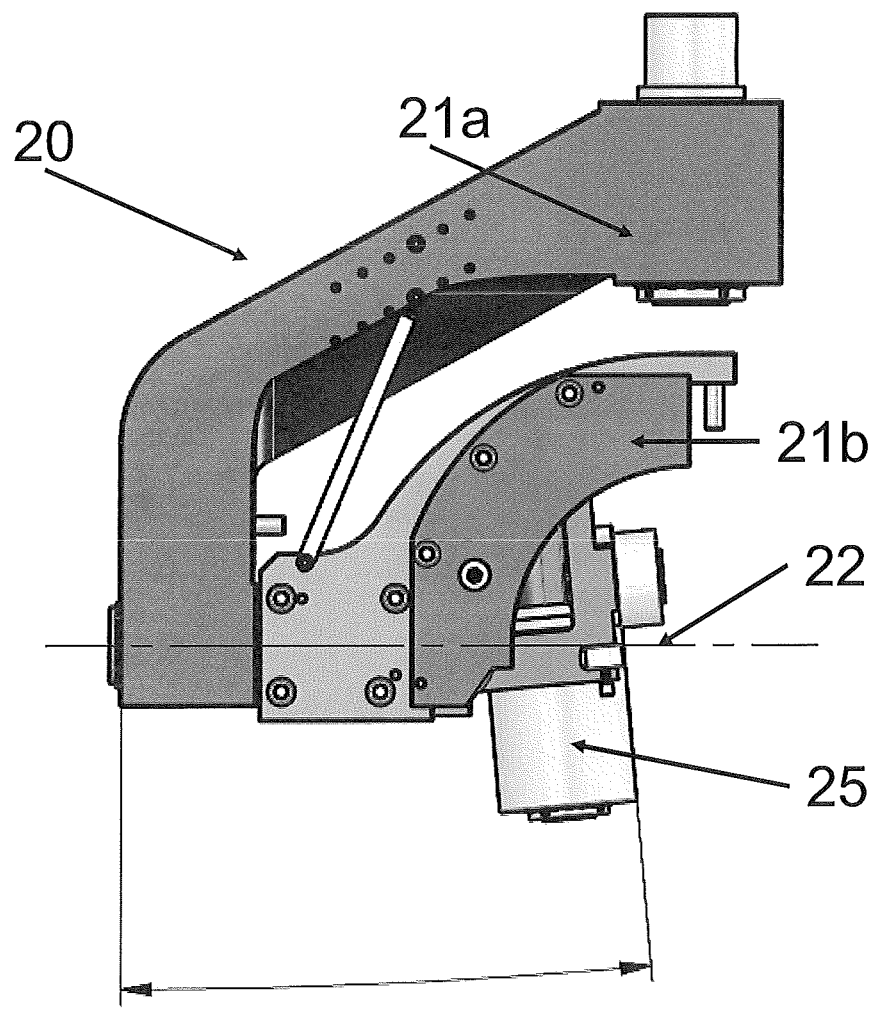
FIG. 3 provides a side-view of a roller 20.

FIG. 3 gives a side-view of a roller 20. The complete tool typically comprises a plurality of rollers 20. These rollers 20 are movably mounted to an overhead three-axis system. That overhead three-axis system is fitted to each gate. They 20 are configured to move along a stator bar to shift the stator bar in the right position so the brackets 17a, 17b of the index towers 5 can engage. The positions of the rollers 20 typically move in three dimensions through lead screws or through belts or through chains.

The rollers 20 provide a first bracket 21a and a second bracket 21b. The second bracket 21b is pivotally (about an axis 22) mounted to the first bracket 21a. The second bracket 21b provides a guide 25 which is pivotally mounted to the second bracket 21b. The pivotal mounting of the guide will be described with reference to FIG. 5. The pivotal mounting of the second bracket 21b and of the guide 25 ensures the roller 20 can be adjusted to any particular shape that a stator bar may take in the bending process.

Figure 4:
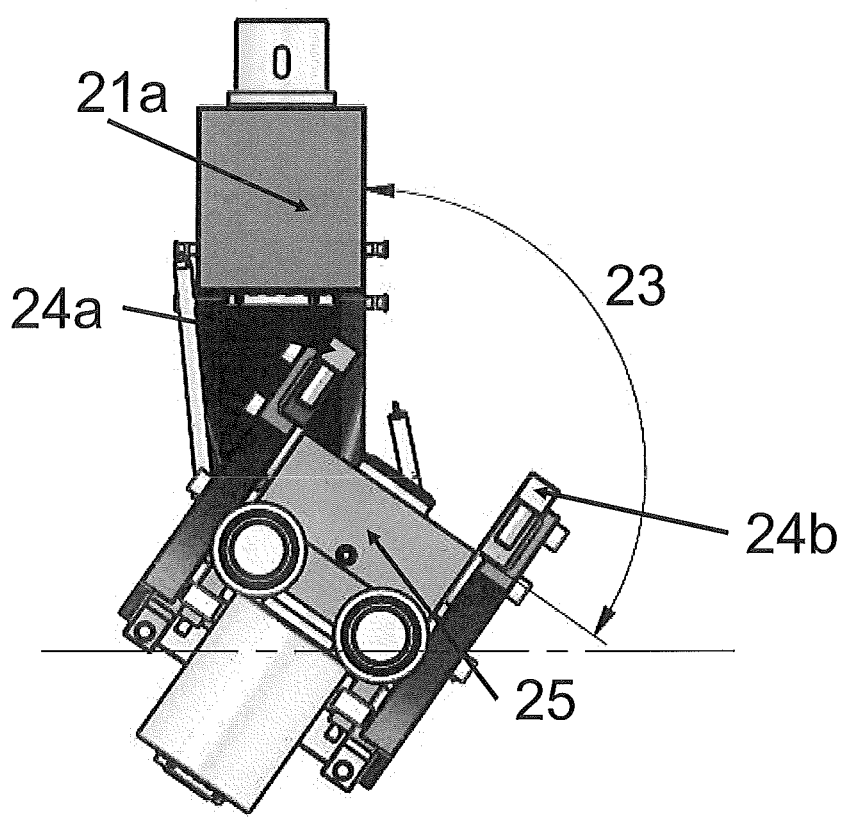
FIG. 4 shows a front-view of the roller 20.

FIG. 4 shows a front-view of the roller 20. In FIG. 4, the second bracket 21b together with the guide 25 has been tilted at an angle 23 with respect to the first bracket 21a. The tilting is a consequence of rotating the second bracket 21b and the guide 25 about the axis 22 shown on FIG. 3. FIG. 4 also shows the second bracket 21b comprises first and second side-walls 24a and 24b.

Figure 5:
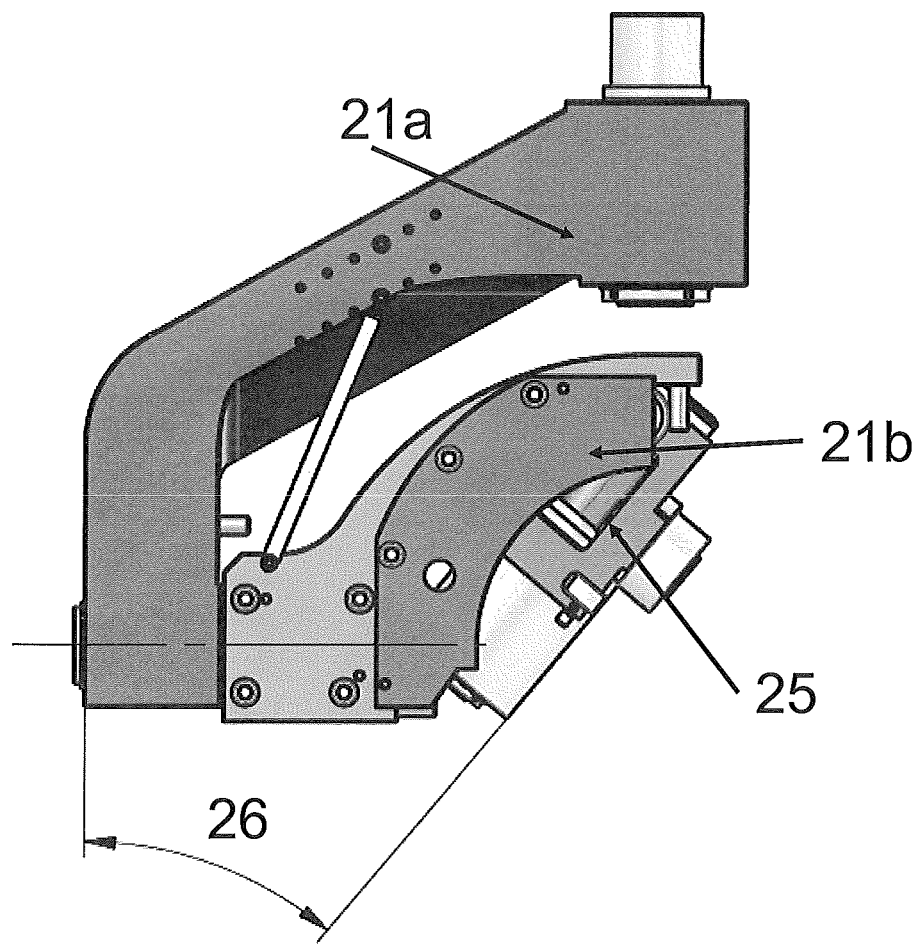
FIG. 5 provides another side-view of the roller 20.

FIG. 5 provides another side-view of the roller 20 and should be compared to FIG. 3. In FIG. 5 the guide 25 has been tilted at an angle 26. In FIG. 5 the rotation of the guide 25 is about an axis perpendicular to the plane of the drawing. That axis stands perpendicular to the aforementioned axis 22 shown on FIG. 3. The rotation of the guide 25 shown on FIG. 5 gives the roller 20 another degree of freedom and allows adjustment to any given shape of a stator bar.

In a preferred embodiment, the guide 25 is mounted to the bracket 21b through a spring. In practice, the tensile force applied by the spring rotates the guide 25 to properly accommodate the stator bar.

The aforementioned embodiments focus on shaping stator bars. It is understood by the skilled person that the same embodiments can also be used to shape rotor bars of power generator. In general, the embodiments can be applied to shape all sorts of generator bars including but not limited to stator and rotor bars.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

The invention claimed is:

1. An index tower to assist in the process of shaping generator bars, the index tower comprising:
   a clamp assembly with brackets configured to hold generator bars;
   a first rail configured to shift the clamp assembly in a first direction;
   a second rail configured to shift the first rail and the clamp assembly in a second direction, wherein
   the clamp assembly comprises a support arranged in between the first rail and the brackets, and
   wherein the brackets are pivotally mounted to the support.

2. The index tower according to claim 1, wherein the first and the second rails are arranged substantially perpendicular.

3. The index tower according to claim 1, wherein the support is configured to rotate about an axis substantially parallel to the direction of the second rail.

4. The index tower according to claim 1, wherein at least one of the rails provides a lead screw for moving at least one member of the index tower.

5. The index tower according to claim 4, wherein the lead screw connects to a wheel.

6. The index tower according to claim 1, wherein at least one rail is configured to shift at least one member of the index tower manually.

7. The index tower according to claim 1, wherein at least one rail is configured to shift at least one member of the index tower automatically.

8. The index tower according to claim 1, wherein the brackets are configured to engage and disengage hydraulically.

9. The index tower according to claim 1, wherein the brackets are configured to engage and disengage pneumatically.

10. The index tower according to claim 1, wherein the index tower comprises at least one motor configured to rotate the pivotally mounted brackets with respect to the support.

11. A complete tool for shaping generator bars, wherein the complete tool comprises a foundation and at least one index tower according to claim 1, wherein the at least one index tower is mounted to the foundation.

12. The complete tool for shaping generator bars according to claim 11, wherein the complete tool comprises less than 20 index towers.

13. The complete tool for shaping generator bars according to claim 11, wherein the complete tool comprises less than 12 index towers.

14. The complete tool for shaping generator bars according to claim 11, wherein the complete tool comprises less than 8 index towers.

15. The complete tool for shaping generator bars according to claim 11, wherein the complete tool comprises at least one roller and an overhead servo three-axis system, wherein the overhead servo three-axis system moves the at least one roller, wherein the at least one roller is configured to move a generator bar in the right position so at least one pair of brackets of at least one index tower can engage said generator bar.

* * * * *